J. McCORNACK.
Hog-Traps.
No. 151,607.
Patented June 2, 1874.
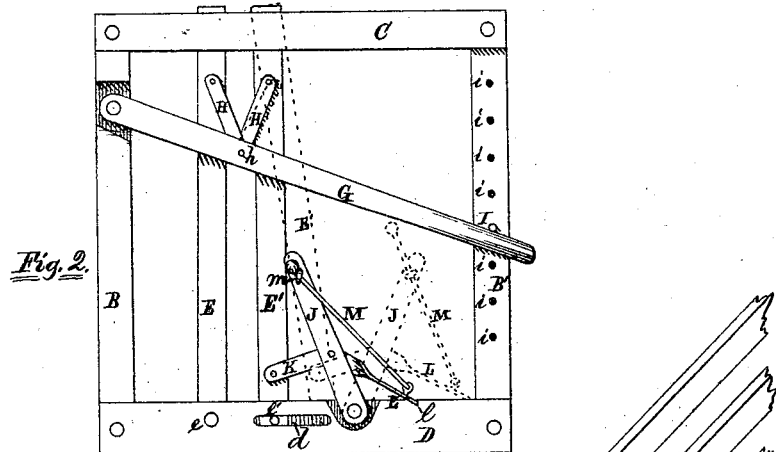
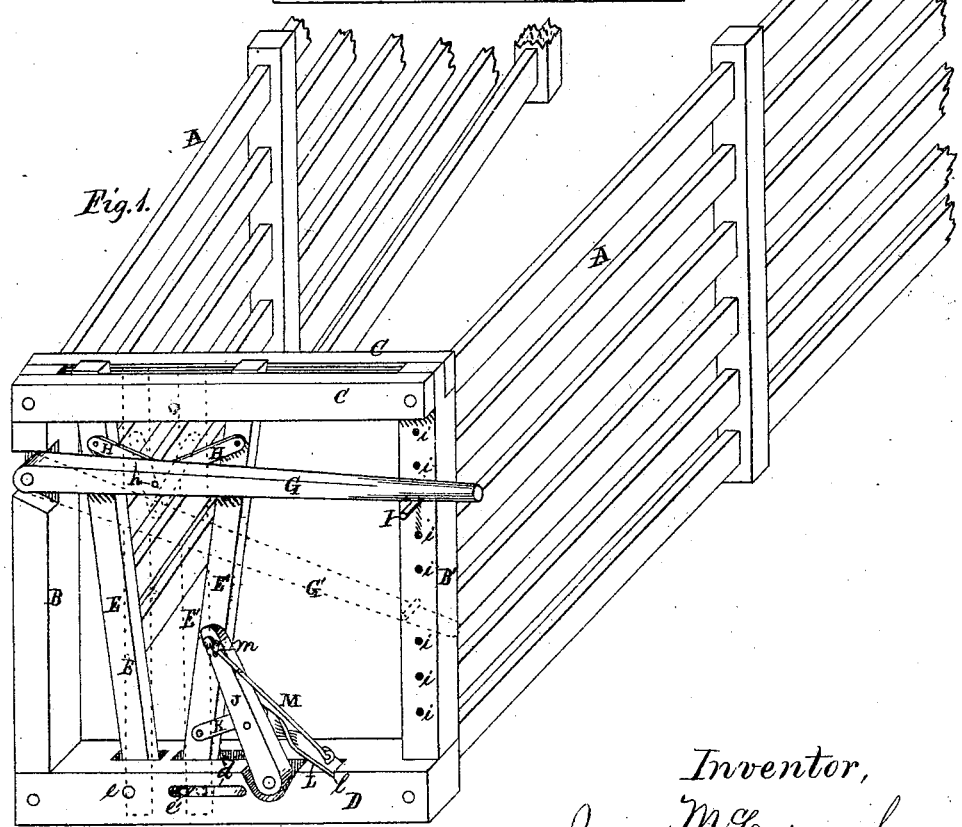
Witnesses:
Platt R. Richards
Mo. H. Barringer
Inventor,
James McCornack,
by W. B. Richards,
Atty.

UNITED STATES PATENT OFFICE.

JAMES McCORNACK, OF VICTORIA, ILLINOIS.

IMPROVEMENT IN HOG-TRAPS.

Specification forming part of Letters Patent No. 151,607, dated June 2, 1874; application filed February 7, 1874.

*To all whom it may concern:*

Be it known that I, JAMES McCORNACK, of Victoria, county of Knox and State of Illinois, have invented certain Improvements in Hog-Traps, of which the following is a specification:

The nature of my invention relates to improvements in traps, or machines for catching and holding hogs for the purpose of ringing or cutting their noses, marking them, &c.; and the invention consists in the arrangement of two vertical bars, pivoted at their lower ends to allow an oscillating movement of their upper ends toward and from each other, by the use of a lever and toggle-joint to catch and hold the hog, one of the oscillating arms being made movable at its lower end, and operated by a lever and arm to withdraw it to allow the hog to pass through, all as hereinafter fully described.

Figure 1 is a perspective view of a trap embodying my invention, and Fig. 2 is an end view.

A A represent side panels, forming a chute leading from any inclosure in which hogs are contained, and having at its outer end the devices of my trap for catching them, one at a time. B B' are posts at the trap-ends of the panels A A. C C are parallel bars, connecting the upper ends of the posts B B; and D is a bar connecting their lower ends. E E' are the jaws or clamping bars. The one E, pivoted in a short slot, as shown, at its lower end in the bar D, by a pin, $e$, and the other, E', pivoted in a long slot, also in the bar D, by a pin, $e'$, which passes through a horizontal slot, $d$, in the bar D, and allows the lower end of the bar E' to be drawn back, for purposes hereinafter fully described. G is a hand-lever pivoted at one end to the post B. H H are toggle-arms, one end of each of which is pivoted by a pin, $h$, to the central part of the hand-lever G, and their other ends, one each to the upper ends of the jaws E E'. I is a pin, and $i\ i\ i\ i$ are a series of holes in the post B'. J is a lever, pivoted at its lower end to the cross-bar D. K is an arm, connected at one end to the central part of the lever J, and at its other to near the lower end of the clamp E'. L is a pawl pivoted at one end to the central part of the lever J, and its other end resting in a catch, $l$, in the upper face of the bar D. M is a wire rod extending from the free end of the pawl L to the upper end of the lever J, where it passes through a staple, $m$.

The operation of my invention is as follows: The levers G and J being in the position shown by full lines at Fig. 1, the lower ends of the jaws E E' will be brought near to each other, and their upper ends apart. While in this position the hogs will crowd toward the opening between the jaws, and when one sticks his head through the lever G may be brought down to the position shown by dotted lines at the same figure, bringing the jaws E E' toward each other and seizing him by the neck, where he may be safely and securely held, of whatever size he may be, and at a higher or lower position, between the said jaws E E', while he is snouted, ringed in the nose, or other operation. To release the hog the lever G may be thrown up, and the lever J drawn back, by lifting the pawl L from the notch $l$ by means of the rod M, thus throwing the bars E E' apart, both at their upper and lower ends, and allowing the hog to pass through without danger from the injury which might occur if the upper ends of the bars E E' were alone separated, to allow of its passage. The lever J may then be thrown back and the pawl L dropped into the notch $l$, bringing the lower ends of the bars E E' together for the reception of another hog to be operated upon.

It will be seen that this trap operating on jaws moving together by the operation of one lever, may be closed quicker than the ordinary trap, and that the construction and arrangement of the jaws is such that any sized hog may be caught and held, without any readjustment of the parts, and further that hogs of any kind, or in any peculiar condition, may be passed through, after they are operated upon, without danger to them.

The trap is boarded up close except the operating-space for the jaws E E'.

I claim—

The jaws E E', pivoted as described, and operating in combination with the levers G and J, arms H, and pawl L, substantially as and for the purpose set forth.

JAMES McCORNACK.

Witnesses:
A. W. BERGGREN,
M. H. BARRINGER.